(12) United States Patent
Deivasigamani et al.

(10) Patent No.: US 11,796,110 B2
(45) Date of Patent: Oct. 24, 2023

(54) MULTI-PURPOSE FITTING

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 37 days.

(21) Appl. No.: 16/837,859

(22) Filed: Apr. 1, 2020

(65) Prior Publication Data
US 2021/0310595 A1 Oct. 7, 2021

(51) Int. Cl.
*F16L 55/027* (2006.01)
*F16L 41/02* (2006.01)
*F16L 23/02* (2006.01)

(52) U.S. Cl.
CPC .......... *F16L 41/021* (2013.01); *F16L 23/02* (2013.01); *F16L 55/02772* (2013.01)

(58) Field of Classification Search
CPC ............ F16L 55/02772; F16L 41/02; F16L 55/02727; F15C 1/18
USPC ............................... 285/130.1, 125.1, 129.1
See application file for complete search history.

(56) References Cited

U.S. PATENT DOCUMENTS

| | | | | |
|---|---|---|---|---|
| 788,803 A * | 5/1905 | Walker | ..................... | E03C 1/122 285/129.2 |
| 1,362,718 A * | 12/1920 | McNamara | ............. | E03C 1/122 285/125.1 |
| 1,451,272 A * | 4/1923 | Robinson | .................. | E02F 7/10 406/92 |
| 1,662,178 A * | 3/1928 | Yuille | ....................... | E02F 7/10 37/336 |
| 1,718,450 A * | 6/1929 | Backus | ................... | E03C 1/122 285/125.1 |
| 1,784,503 A * | 12/1930 | Swann | ..................... | B28C 5/026 366/11 |
| 1,878,948 A * | 9/1932 | Luff | ........................ | E03C 1/122 285/125.1 |
| 2,078,879 A * | 4/1937 | Kaiser | ..................... | E03C 1/122 285/129.1 |
| 2,423,633 A * | 7/1947 | Baden | ................. | F24D 19/0004 285/125.1 |
| 2,548,788 A * | 4/1951 | Helme | ................... | B05B 15/50 285/125.1 |
| 2,660,195 A * | 11/1953 | Risley | .................. | F16K 27/062 285/125.1 |

(Continued)

FOREIGN PATENT DOCUMENTS

| | | | | |
|---|---|---|---|---|
| CA | 2699371 A1 * | 4/2009 | ............... | F24J 3/083 |
| DE | 202011051340 U1 * | 10/2011 | .............. | F16L 41/02 |

(Continued)

*Primary Examiner* — David Bochna
(74) *Attorney, Agent, or Firm* — Jong Patent Firm; Cheng Ning Jong; Tracy P. Jong

(57) ABSTRACT

A fitting including a main tube including a central axis, a first end and a second end; a branch tube including a central axis, a first end and a second end, wherein the branch tube extending at the first end of the branch tube from the main tube in a first direction between the first end and the second end of the main tube to the second end of the branch tube; a first sub-tube extending from the main tube between the first end and the second end of the main tube in a second direction.

1 Claim, 13 Drawing Sheets

(56) References Cited

U.S. PATENT DOCUMENTS

| | | | | |
|---|---|---|---|---|
| 3,307,205 A | * | 3/1967 | Moeschler | F16L 41/02 4/696 |
| 3,495,281 A | * | 2/1970 | Palowsky | E03C 1/122 285/129.1 |
| 3,869,154 A | * | 3/1975 | Sanchez | F16L 41/02 285/133.21 |
| 4,449,741 A | * | 5/1984 | Litvin | F16L 41/03 285/129.1 |
| 5,415,438 A | * | 5/1995 | Kojima | F16L 41/03 285/125.1 |
| 6,056,014 A | * | 5/2000 | Kojima | F16L 41/02 138/37 |
| 7,021,671 B2 | * | 4/2006 | Evans | E03F 1/002 137/561 A |
| 7,140,394 B2 | * | 11/2006 | Eveleigh | G05D 23/1346 138/42 |
| 8,110,267 B2 | * | 2/2012 | Houston | A61F 2/86 604/93.01 |
| 10,458,446 B1 | * | 10/2019 | Schmidt | B01F 25/432 |
| 2013/0019981 A1 | * | 1/2013 | Yandle, II | F16L 23/0286 137/590 |
| 2014/0097372 A1 | * | 4/2014 | Roth | F04B 53/18 251/318 |

FOREIGN PATENT DOCUMENTS

| | | | | |
|---|---|---|---|---|
| FR | 3063812 A1 | * | 9/2018 | G21F 3/00 |
| GB | 1387509 A | * | 3/1975 | F16L 25/08 |
| JP | 2000017703 A | * | 1/2000 | |
| KR | 20150118463 A | * | 10/2015 | F02M 35/1205 |
| WO | WO-2014188223 A1 | * | 11/2014 | F15D 1/025 |

\* cited by examiner

MULTI-PURPOSE FITTING

BACKGROUND OF THE INVENTION

1. The Field of the Invention

The present invention relates to a multi-purpose fitting. More specifically, the present invention is directed to a multi-purpose fitting adaptable to fluid conductors.

2. Background Art

Conventional fluid flow paths are constructed from individual and discrete nipples, flange extensions, couplings, tees, elbows, reducers, etc., which together can cause the simplest fluid flow paths to span great lengths and take up valuable space. More importantly, losses due to the length of the fluid flow paths and the losses due to the individual parts can add up significantly to cause the pressure drops that are sufficiently significant to require the use of pumps or larger pumps to overcome the larger pressure drops.

There exists a need for a multi-purpose fitting which can offer various functionalities not possible in a single conventional fitting, to make a fluid flow path more compact, simpler and cost effective to construct and one which causes a lower pressure drop and one that is more efficient to run.

SUMMARY OF THE INVENTION

In accordance with the present invention, there is provided a fitting including:
(a) a main tube including a central axis, a first end and a second end;
(b) a branch tube including a central axis, a first end and a second end, wherein the branch tube extending at the first end of the branch tube from the main tube in a first direction between the first end and the second end of the main tube to the second end of the branch tube; and
(c) a first sub-tube extending from the main tube between the first end and the second end of the main tube in a second direction.

In one embodiment, the fitting further includes a second sub-tube extending from the main tube between the first end and the second end of the main tube in a third direction, wherein the third direction is substantially opposite that of the second direction. In one embodiment, the fitting further includes at least one third sub-tube extending from of the main tube in a fourth direction, wherein the fourth direction is substantially opposite that of the first direction. In one embodiment, the second direction is disposed at substantially right angle with respect to the first direction. In one embodiment, the second direction is disposed at substantially right angle with respect to the central axis of the main tube. In one embodiment, the second direction is substantially parallel to the first direction and the second direction is disposed at substantially right angle with respect to the central axis of the main tube. In one embodiment, the main tube further includes a first flange disposed on the first end of the main tube. In one embodiment, the main tube further includes a second flange disposed on the second end of the main tube. In one embodiment, the branch tube further includes a third flange disposed on the second end of the branch tube. In one embodiment, the fitting is constructed from a cast fitting. In one embodiment, the fitting is formed by means of additive manufacturing. In one embodiment, a lumen of the branch tube is substantially the same size as a lumen of the main tube.

In accordance with the present invention, there is further provided a flow modifier including a reducer tube including a central axis, an inlet end, an outlet end and a surface pattern disposed on an inner surface of the reducer tube, the inlet end of the reducer tube configured for receiving a flow from the inlet end of the reducer tube to the outlet end of the reducer tube, wherein the surface pattern comprises at least one groove which swirls about the central axis of the reducer tube from the inlet end to the outlet end of the reducer tube to increase mixing of the flow through the flow modifier. In one embodiment, the flow modifier further includes a flange disposed on the inlet end of the flow modifier.

An object of the present invention is to provide a fitting having tubes and sub-tubes that can be customized to form interfaces for support structures, sensors, switches and structures supported by the fitting.

Another object of the present invention is to provide a fitting that is not only suitable for receiving another fitting or a fluid conductor but also a switch or sensor.

Another object of the present invention is to provide a component to which a switch or a sensor can be installed such that no custom installation of such a device (often directly to a fluid conductor) is necessary.

Another object of the present invention is to provide a fitting that can be coupled with like fittings to increase the number of points of connection to the resulting fitting.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—multi-purpose fitting
4—flow
6—flow modifier
8—groove of flow modifier
10—flange of flow modifier
12—inlet end of flow modifier
14—outlet end of flow modifier
16—main tube
18—first end of main tube
20—second end of main tube
22—branch tube
24—flange of branch tube
26—first sub-tube
28—diameter of first sub-tube
30—length of first sub-tube
32—screw
34—nut
36—flange width
38—flange diameter
40—length of fitting
42—through hole
44—nipple
46—tee
48—fastener
50—filter
52—controller
54—support
56—support bracket
58—second sub-tube
59—diameter of second sub-tube
60—third sub-tube
61—diameter of third sub-tube
62—flowmeter
64—outlet flow
66—split flow
68—flow through filter
70—central axis of flow modifier
72—length of second sub-tube
74—length of third sub-tube
76—tube
78—female-threaded connector
80—fastener
82—fitting
84—flange
86—male-threaded connector
88—electrical leads
90—sensor
92—cap
94—screw
96—opening
98—opening
100—opening
102—coupler
104—coupler
106—coupler
108—fluid flow
110—fluid flow
112—fluid flow
114—fluid flow
116—central axis of main tube
118—central axis of branch tube
120—central axis of first sub-tube
122—central axis of second sub-tube
124—central axis of third sub-tube Particular Advantages of the Invention A casting for the present fitting can be used as a blank that can be reduced or machined into a structure with multi-purpose connecting points, some for accommodating flows and others for receiving sensors and switches, etc. Therefore, the present fitting can be used to replace a fluid system that is built from numerous discrete parts. Compared to a conventional fluid path constructed from individual and discrete nipples, flange extensions, couplings, tees, elbows, reducers, etc., the present fitting reduces the head loss due to the increased composite length and also the higher loss coefficients of conventional fittings.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
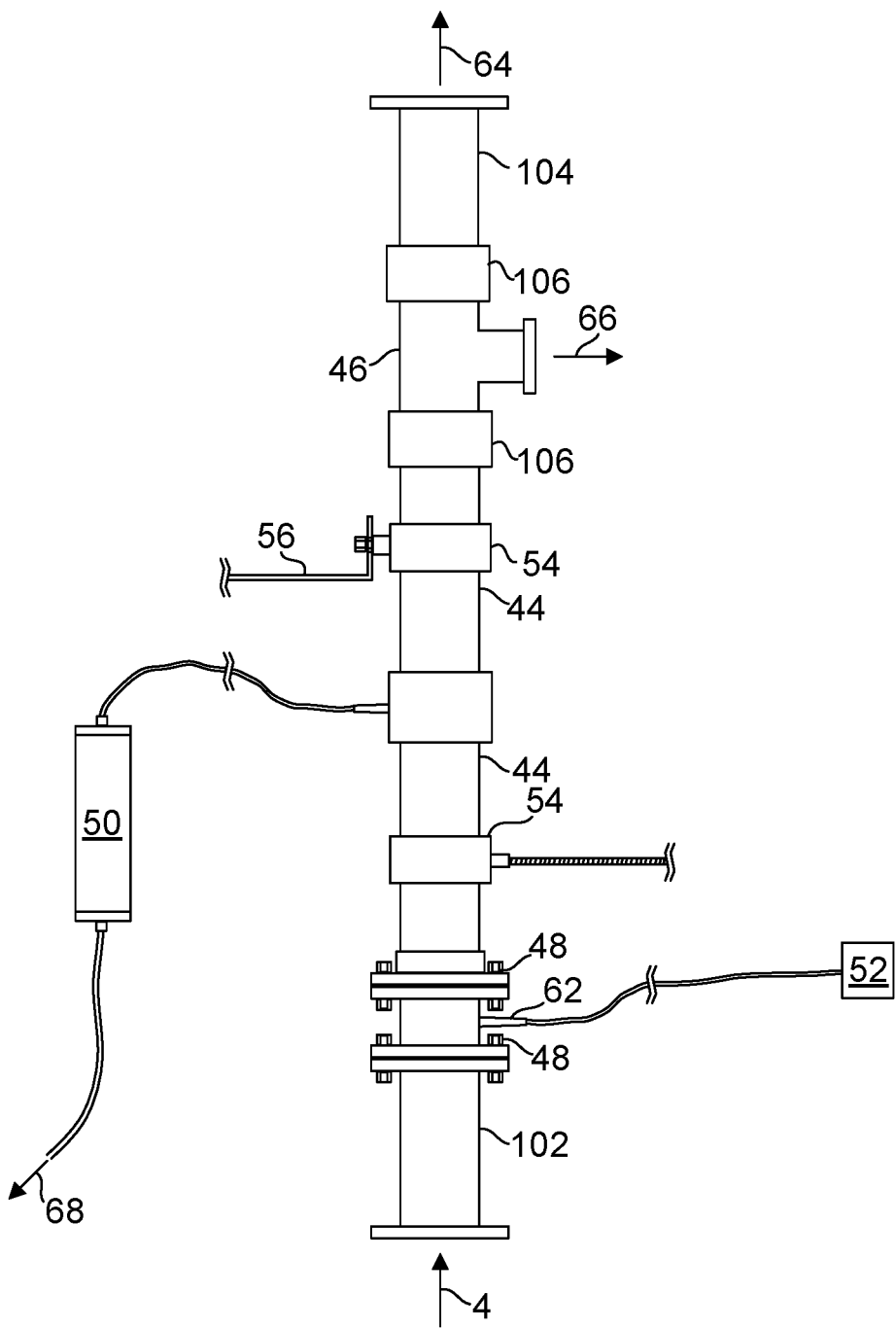
FIG. 1 is a diagram depicting conventional means for combining various components to form a fluid system.

FIG. 1 is a diagram depicting conventional means for combining various components to form a fluid system. It shall be noted that in order to incorporate a flowmeter 62 that is connected to a controller 52 to the fluid system which channels a flow 4 from an inlet coupler 102, to an outlet coupler 104, a coupler with the flowmeter 62 integrally built, is disposed between the inlet coupler 102 and the outlet coupler 104 and secured with fasteners 48. Likewise, for splitting the flow 4 from the outlet coupler 104, a tee 46 is disposed between the inlet coupler 102 and the outlet coupler 104 to split flow 4 into flow 64 at the outlet coupler 104 and flow 66 through the tee 46. Again, for supplying a filter 50 with a flow to produce a filtered flow 68, a coupler with the filter 50 is disposed between the inlet coupler 102 and the outlet coupler 104. Further, for the fluid system to be properly supported, a support or ring 54 and a support bracket 56 are provided each to support the fluid system at a nipple 44. As can be seen and appreciated, the fluid system includes, among other parts, two nipples 44 and two couplers 104, 106 to allow the filter 50, flowmeter 62, tee 46 to be incorporated in the fluid system and for the support 54 and the support 56 to be used to support the fluid system. A present fitting reduces the number of parts, space required to accommodate the parts and the cost associated with procuring the parts by allowing various functions to be perform with each fitting. It shall be appreciated, upon perusing the disclosure elsewhere herein, compared to a conventional fluid system constructed from individual and separate nipples, couplers and/or fittings, the present fitting significantly reduces the head loss due to the increased composite effective length of the conventional fluid system and also the higher loss coefficients of those nipples, couplers and/or fittings.

Figure 2A:
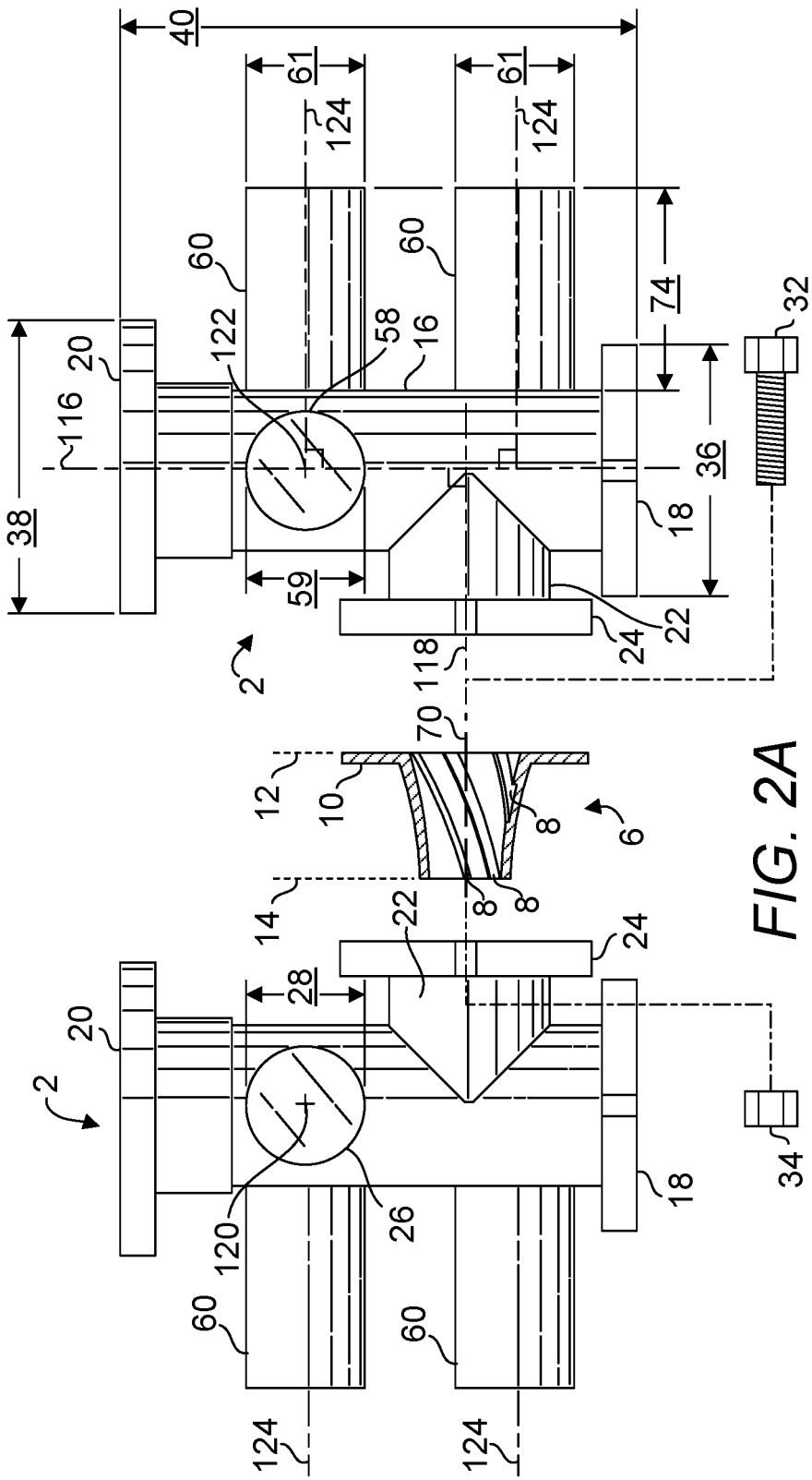
FIG. 2A is a diagram depicting fittings and a flow modifier useful for modifying a flow between the fittings.
Figure 2B:
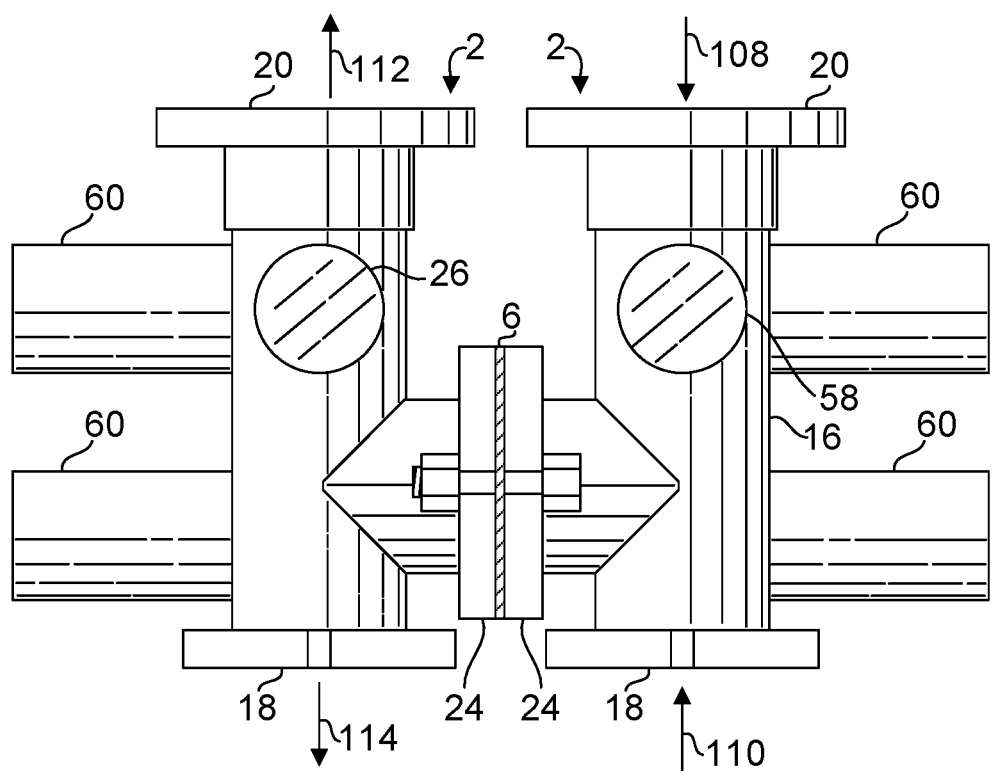
FIG. 2B is a diagram depicting the fittings and flow modifier of FIG. 2A having been coupled together.

FIG. 2A is a diagram depicting fittings and a flow modifier 6 useful for modifying a flow between the fittings 2. FIG. 2B is a diagram depicting the fittings 2 and flow modifier 6 of FIG. 2A having been coupled together by means of screws 32 and nuts 34. A fitting 2 includes a main tube 16 including a central axis 116, a first end and a second end; a branch tube 22 including a central axis 118, a first end and a second end, wherein the branch tube 22 extends at the first end of the branch tube from the main tube 16 in a first direction between the first end and the second end of the main tube 16 to the second end of the branch tube; a first sub-tube 26 extending from the main tube 16 between the first end and the second end of the main tube 16 in a second direction; and a second sub-tube 58 extending from the main tube 16 between the first end and the second end of the main tube 16, wherein the third direction is substantially opposite that of the second direction. In one embodiment, an opening 96 is shown disposed at the second end of the first sub-tube 26 for receiving a sensor, etc. As disclosed herein, a sub-tube is essentially a tube that is not cast or formed with an end that is designed for connection with a main fluid conductor outside of the fitting, e.g., one without a flange that offers a base for fasteners, e.g., screws and nuts. Fluid connection of a present fitting to another main fluid conductor is accomplished with the main tube 16 and branch tube 22. If one end of a main tube 16 or a branch tube 22 is not intended to be interfaced with another fluid conductor, its open end may be capped with a plate and secured to the flange with fasteners via through holes 42 (see FIG. 3). Appropriate gaskets, e.g., rubber gaskets, etc., may be used between the plate and the flange to prevent leaks. By providing a branch tube 22 in a direction at right angle to the main tube 16, where the lumen of the branch tube 22 is of the same size (or diameter) or substantially the same size (or diameter) as the lumen of the main tube 16, i.e., within about 5% of one another, the present fitting allows a fluid system or flow path built upon it to extend laterally, enabling the flow path to be more compact compared to one which extends only in length or in a direction of its main flow path. One or more sub-tubes is provided to accommodate one or more parts or equipment that are generally not related to the efficient flow of a fluid through the fitting, e.g., a sensor, a filtered water flow, a support, etc. In their preferred embodiments, the lumen or diameter of a sub-tube is smaller than the diameter of a branch tube or a main tube and a sub-tube is configured to extend in a direction that is not the same as the direction in which the branch tube extends to ensure that there is sufficient space for the part or equipment to be connected to the sub-tube.

In one embodiment, the main tube 16 further includes a first flange disposed on the first end 18 of the main tube. In one embodiment, the main tube 16 further includes a second flange disposed on the second end 20 of the main tube. In one embodiment, the branch tube 22 further includes a third flange 24 disposed on the second end of the branch tube 22. These flanges provide secure connections of the fitting to outside elements. Other means of connection are possible.

However, flanged connections remove the guesswork (in the number of turns of the nipples) required in securing nipples to couplers for instance, making the coupling of the parts easier. In one embodiment, the first sub-tube 26 is configured to extend from the main tube 16 at substantially right angle with respect to the central axis of the branch tube 22. In one embodiment, the second sub-tube 58 is configured to extend from of the main tube 16 at substantially right angle with respect to the central axis of the branch tube 22. In one embodiment, the fitting further includes at least one third sub-tube 60 extending from of the main tube 16 in a fourth direction, wherein the fourth direction is substantially opposite that of the first direction. An opening 98 is shown disposed at a distal end of a third sub-tube 60. An opening 100 is shown disposed at a distal end of another third sub-tube 60. The sub-tubes 26, 58, 60 may be cast to standard lengths before being customized to accommodate various equipment of a fluid system, e.g., sensors, switches, filtered water supply line, etc. Note also the central axes 120, 120, 124 of the first, second and third sub-tubes in FIG. 2A. In one embodiment, the length 30, 72, 74 of a sub-tube 26, 58, 60 ranges from about 1.5 cm to about 5 cm pre-customization. In one embodiment, the diameter 28, 59, 61 of a sub-tube 26, 58, 60 ranges from about 1.5 cm to about 3 cm pre-customization. In one embodiment, the width 36 of the first flange of the main tube ranges from about 7 cm to about 10 cm. In one embodiment, the diameter 38 of the second flange of the main tube ranges from about 8 cm to about 12 cm. In one embodiment, the length 40 of fitting 2 ranges from about 20 cm to about 30 cm.

In forming a present fitting, a cast fitting is first produced, with all the cavities in the fitting already cast with techniques, e.g., lost wax method, etc., or three-dimensional (3D) printing or other additive manufacturing techniques. If additive manufacturing techniques are employed, the fitting can be customized to be manufactured into its final shape with all of the tubes and sub-types already formed for their intended purposes as no further machining will be required. However, if the fitting is cast, the sub-tubes may all be cast into a common length such that the final lengths, shapes or structures of the sub-tubes can be customized according to their specific purposes.

In one embodiment, there is further provided a flow modifier 6 configured for enhancing mixing of a flow through it. In the example shown in FIG. 2A, a flow communicated from a first fitting 2 to a second fitting 2 can be modified using the flow modifier 6. The flow modifier 6 is essentially a reducer tube including an inlet end that is larger than the outlet end and a flange 10 disposed on the inlet end to facilitate the mounting of the flow modifier by disposing the flange of the flow modifier between and secured with the flanged ends of fluid conductors. As the flow modifier 6 constricts from its inlet end 12 to its outlet end 14, the flow speed is increased, causing the flow to be mixed more rigorously. This increase in mixing is further enhanced by grooves 8 which swirl around the central axis 70 of the flow modifier 6 where the grooves 8 are disposed on the inner wall of the flow modifier 6, i.e., the grooves 8 are not disposed in parallel with the central axis 70 of the flow modifier 6. In one example, a flow modifier 6 is useful for increasing the temperature uniformity of a merged flow of two upstream flows disposed at different temperatures. Referring to FIG. 2B, the flow modifier 6 is configured to receive the two flows, an incoming flow 108 which is disposed at a temperature that is different from the temperature of another incoming flow 110 to produce a merged flow that is dispersed as flow 112 and flow 114, each having a uniform temperature.

Figure 3:
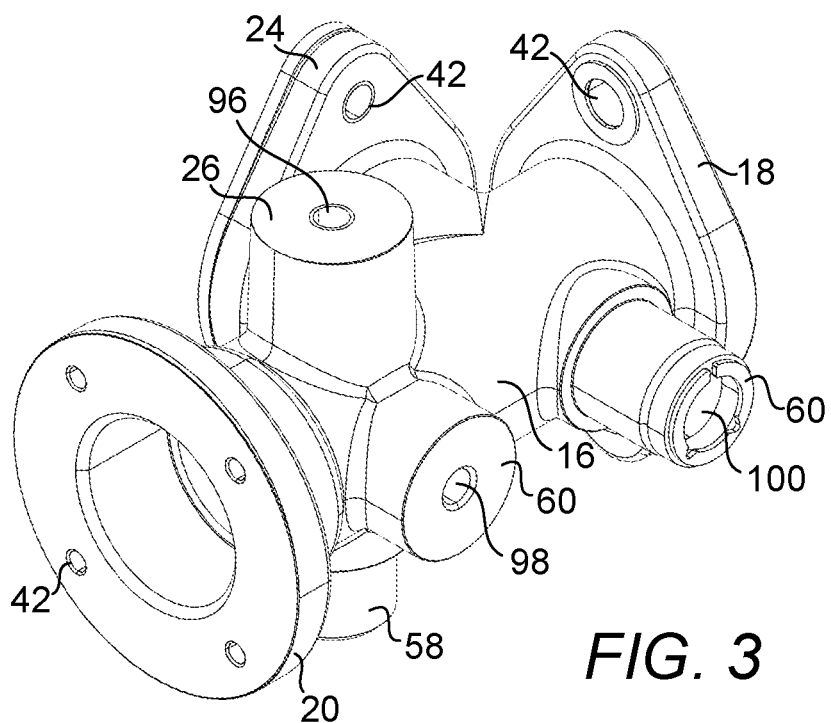
FIG. 3 is a top perspective view of one of the fittings of either FIG. 2A or FIG. 2B having at least one sub-tube that has been customized for a specific connection.
Figure 4:
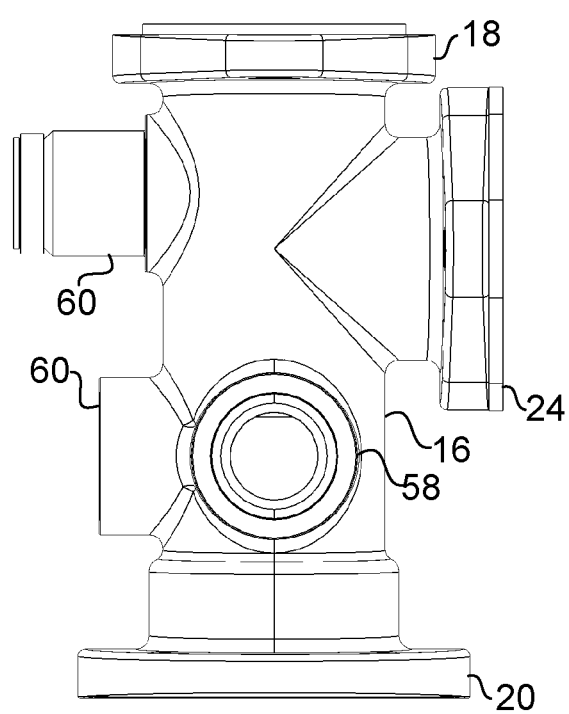
FIG. 4 is a bottom view of one of the fittings shown in FIG. 3.
Figure 5:
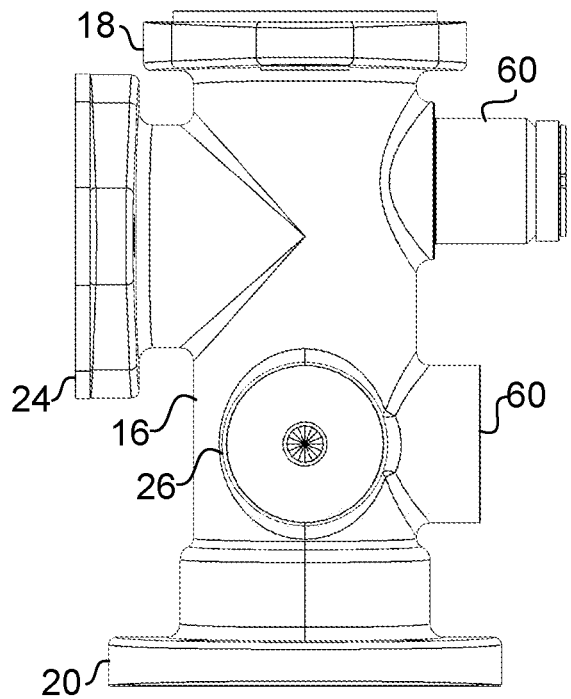
FIG. 5 is a top view thereof.
Figure 6:
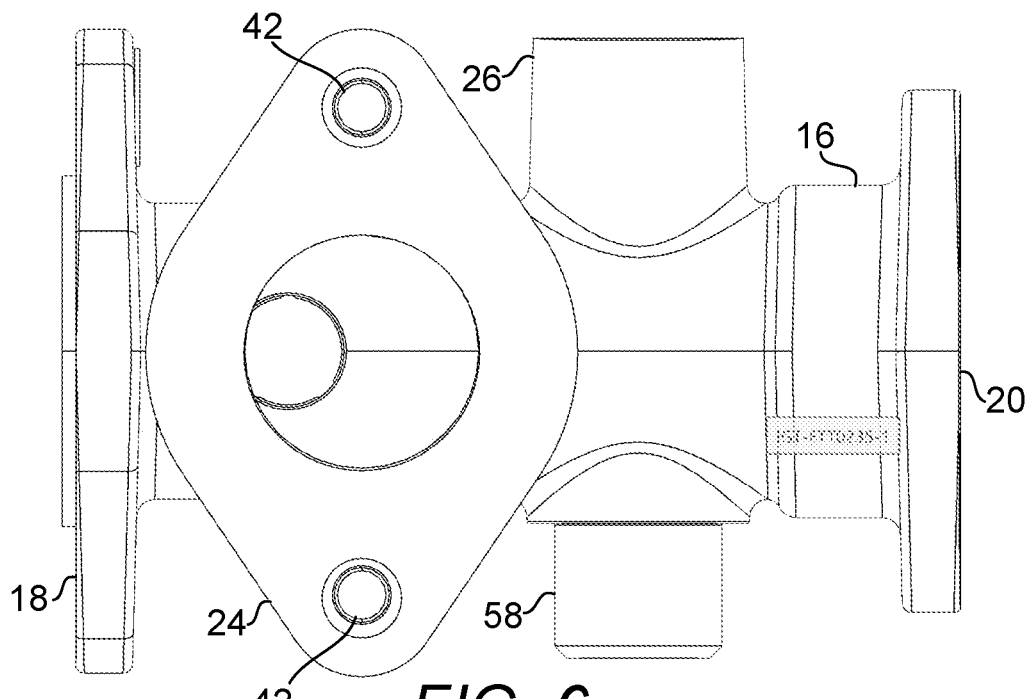
FIG. 6 is a left side view thereof.
Figure 7:
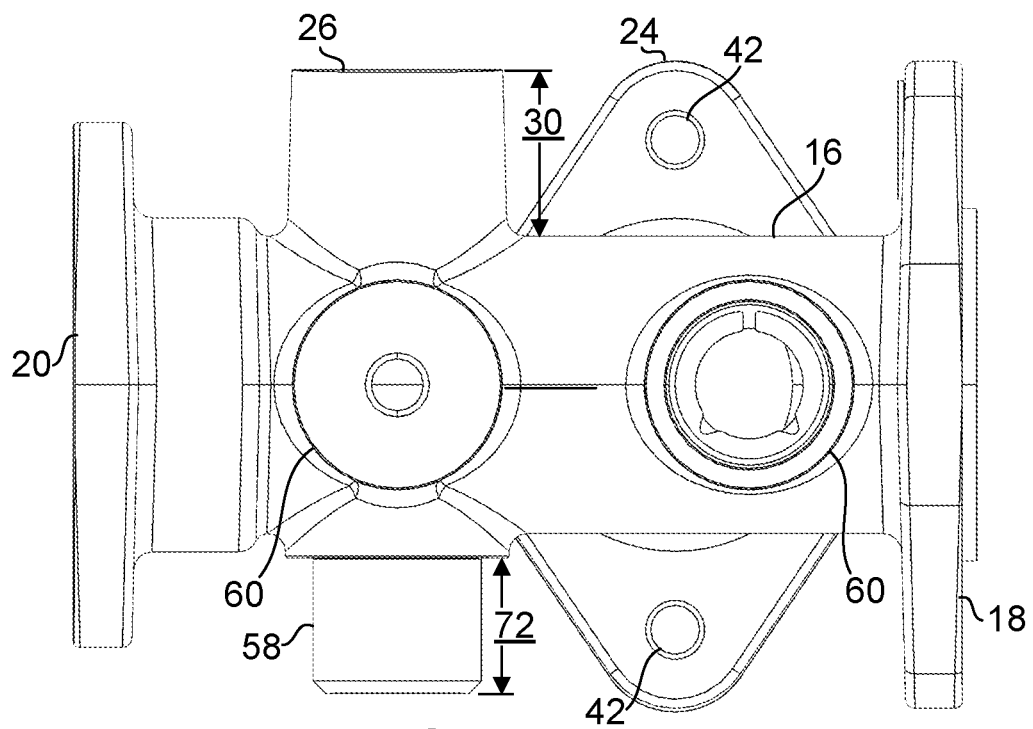
FIG. 7 is a right side view thereof.
Figure 8:
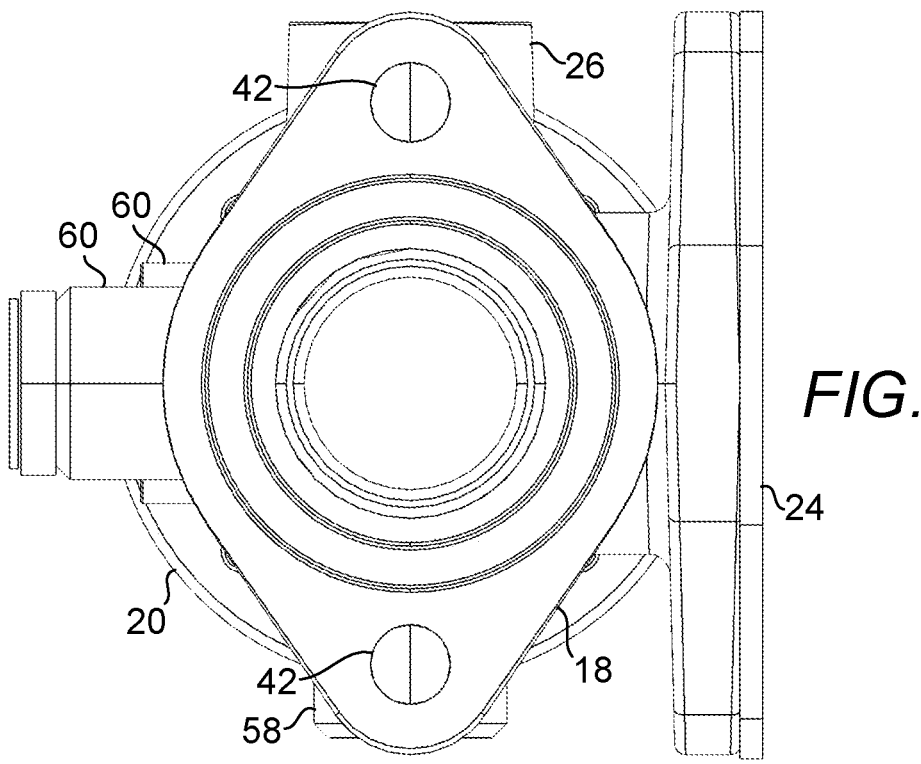
FIG. 8 is a rear view thereof.
Figure 9:
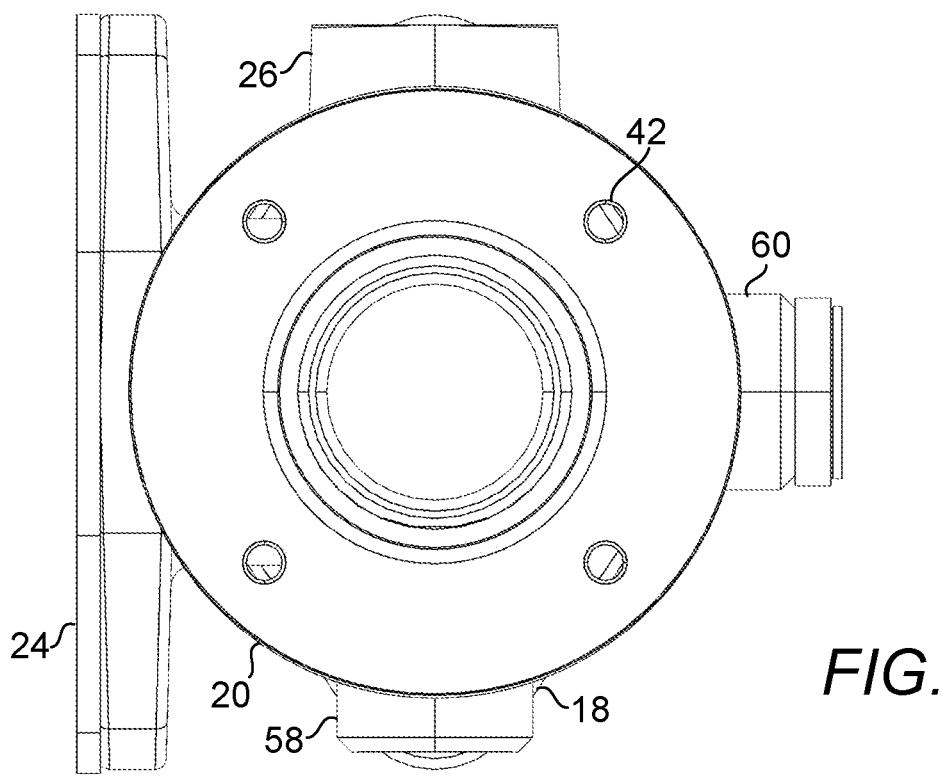
FIG. 9 is a front view thereof.
Figure 10:
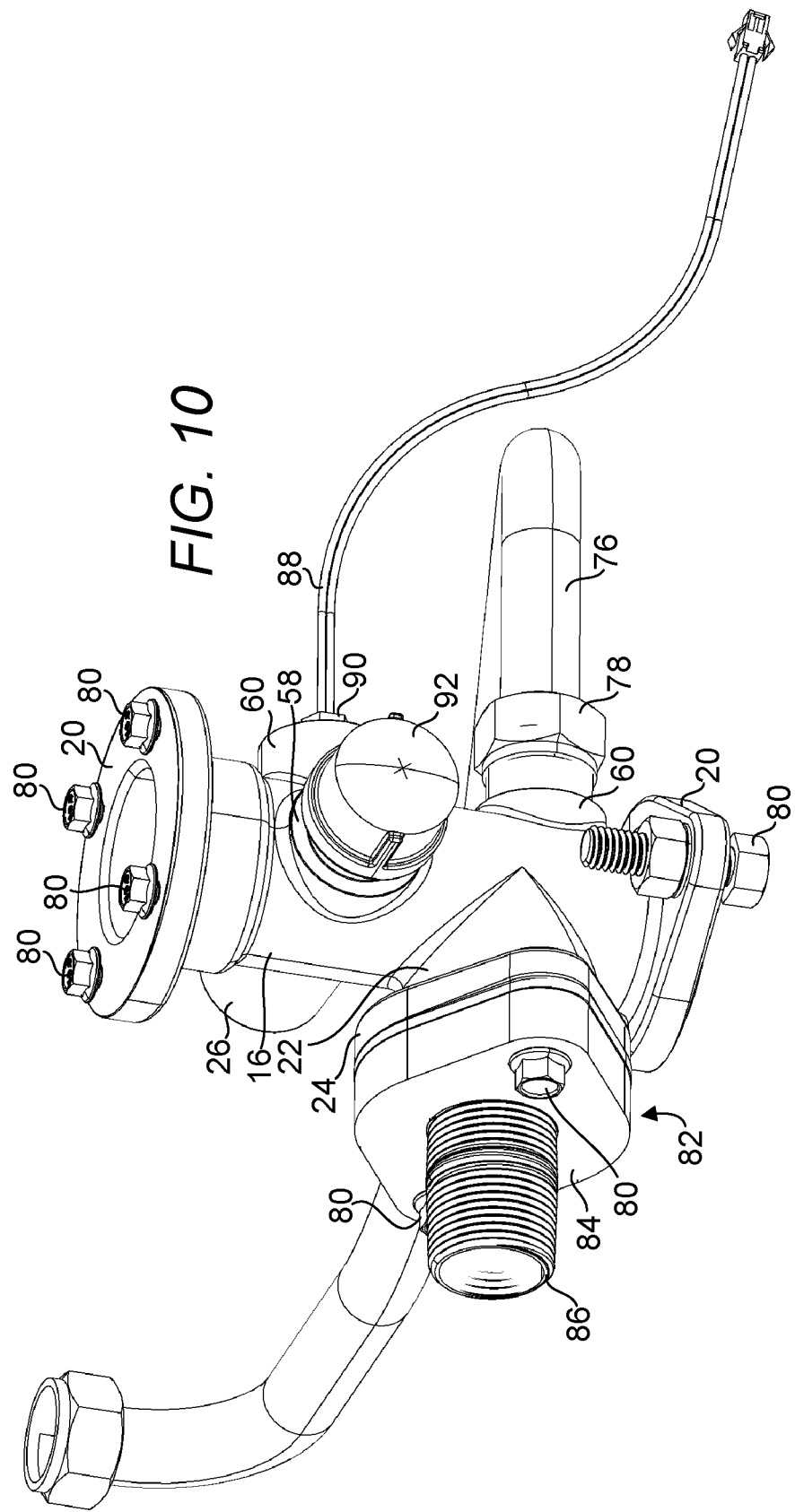
FIGS. 10-12 are various views of a present fitting having been modified to connect to various parts or equipment.
Figure 11:
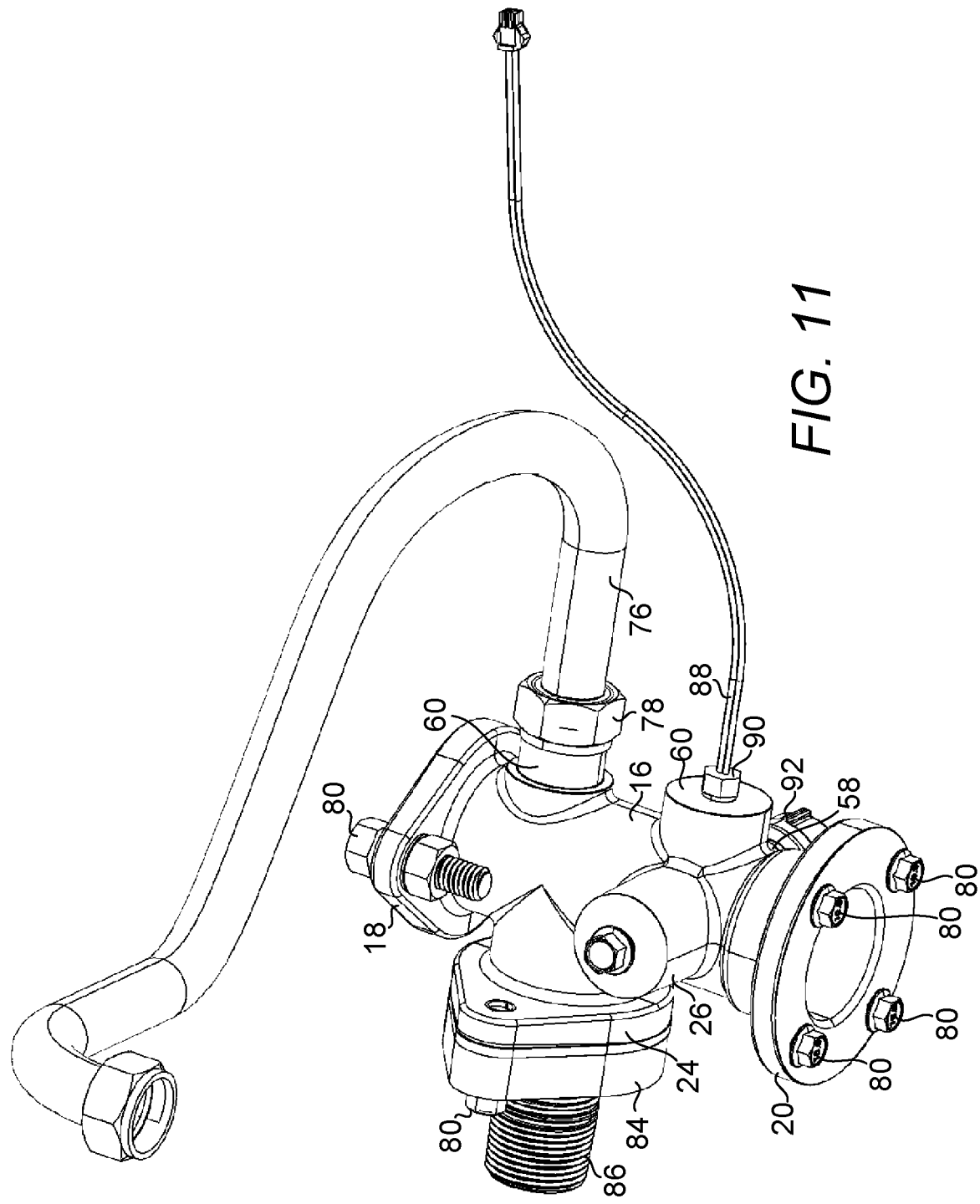
Figure 12:
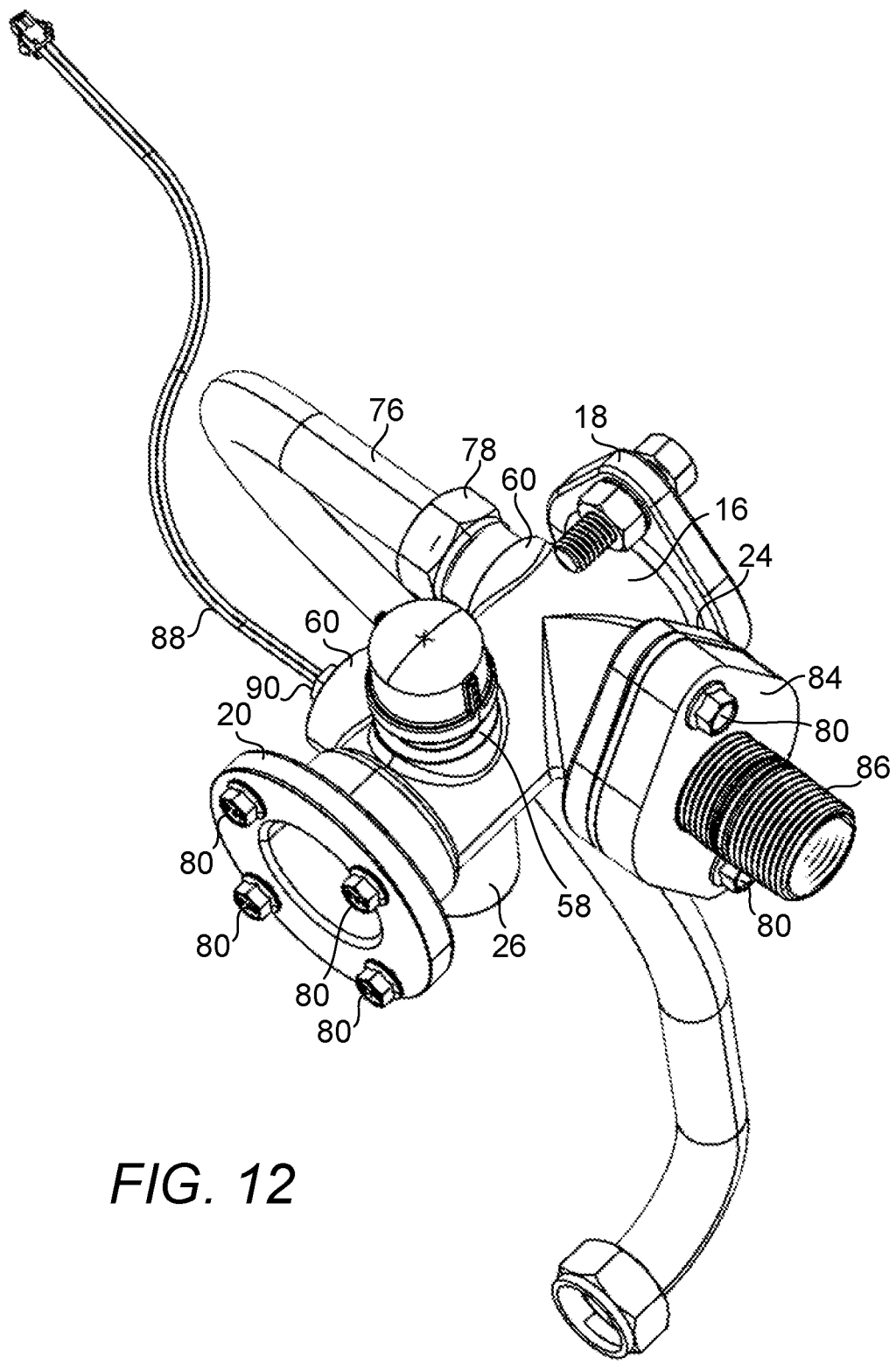

FIG. 3 is a top perspective view of one of the fittings of either FIG. 2A or FIG. 2B having at least one sub-tube that has been customized for a specific connection with an equipment. FIGS. 4, 5, 6, 7, 8 and 9, are bottom, top, left side, right side, rear and front view, respectively, thereof. FIGS. 10-12 are various views of a present fitting having been modified to connect to various parts or equipment without requiring numerous other parts as those shown on FIG. 1. Here, a tube 76 is connected to the third sub-tube 60 by means of a female-threaded connector 78. A flanged male-threaded connector 86 fitting 82 includes a flange 84 securely coupled to the flange 24 of the branch tube 22 by means of fasteners 80. The second sub-tube 58 is useful as a drain and therefore can be capped with a cap 92 while the present fitting is in use. It shall be noted that a sensor 90 (shown with electrical leads 88) can be installed to the fitting, e.g., via a third sub-tube 60 without requiring a separate nipple as compared to a conventional fluid system shown in FIG. 1.

Figure 13:
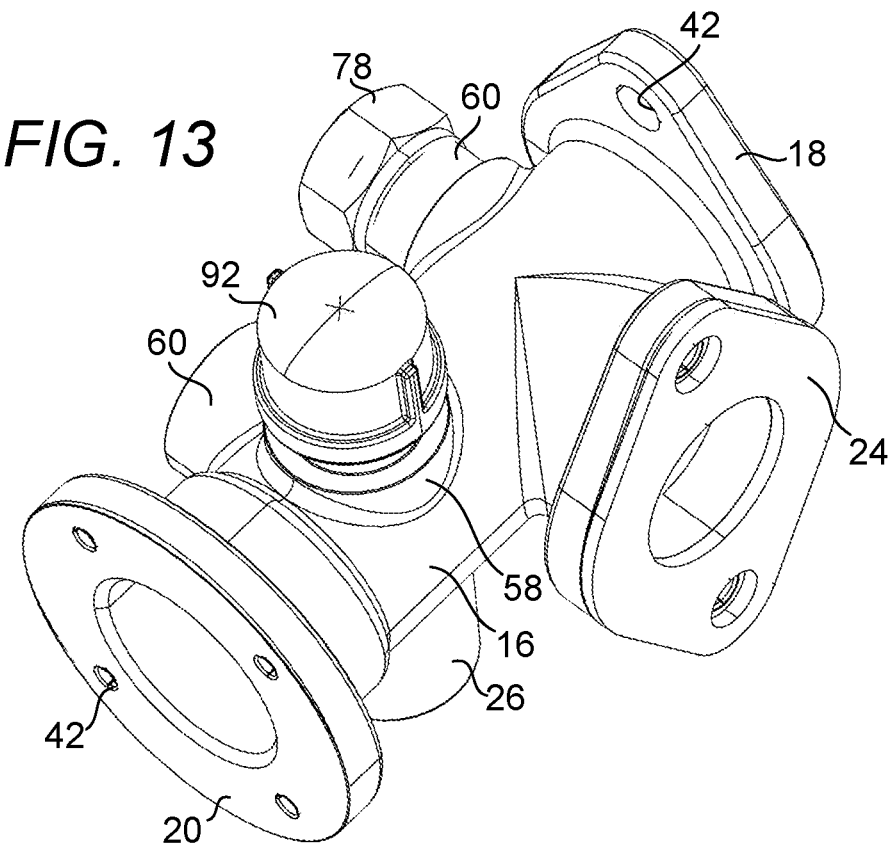
FIG. 13 is a bottom front perspective view of a present fitting having been modified to connect to various parts or equipment.
Figure 14:
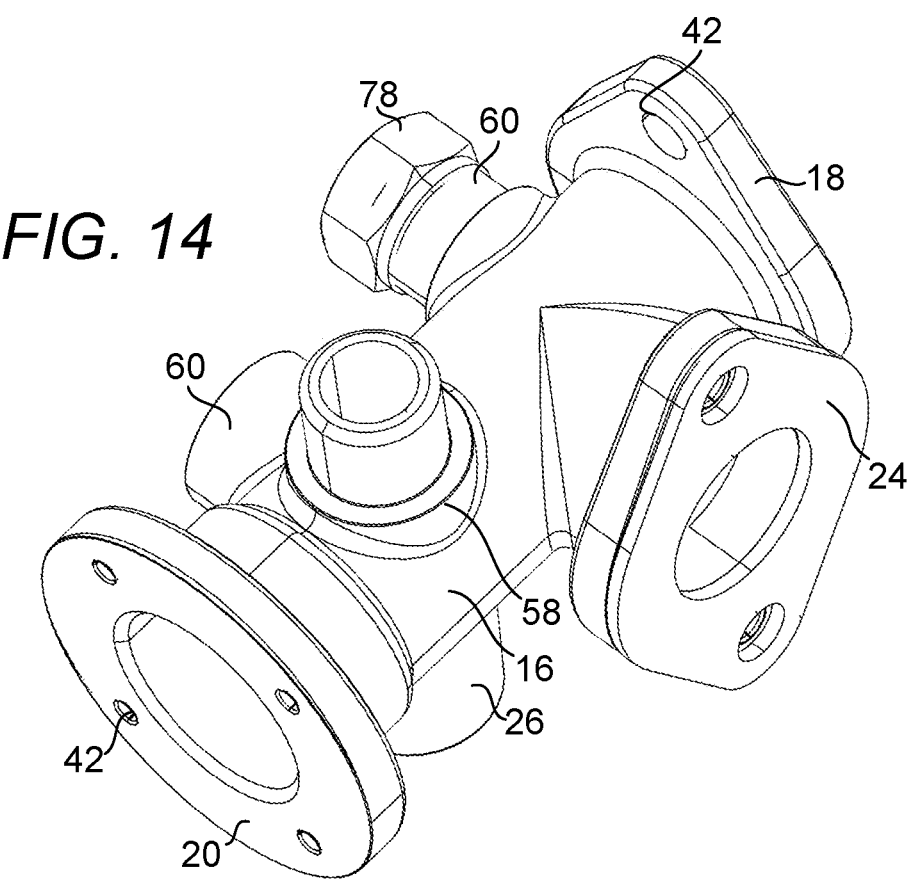
FIG. 14 depicts one example of the present fitting with a cap removed to show a manner in which the present fitting can be used.
Figure 15:
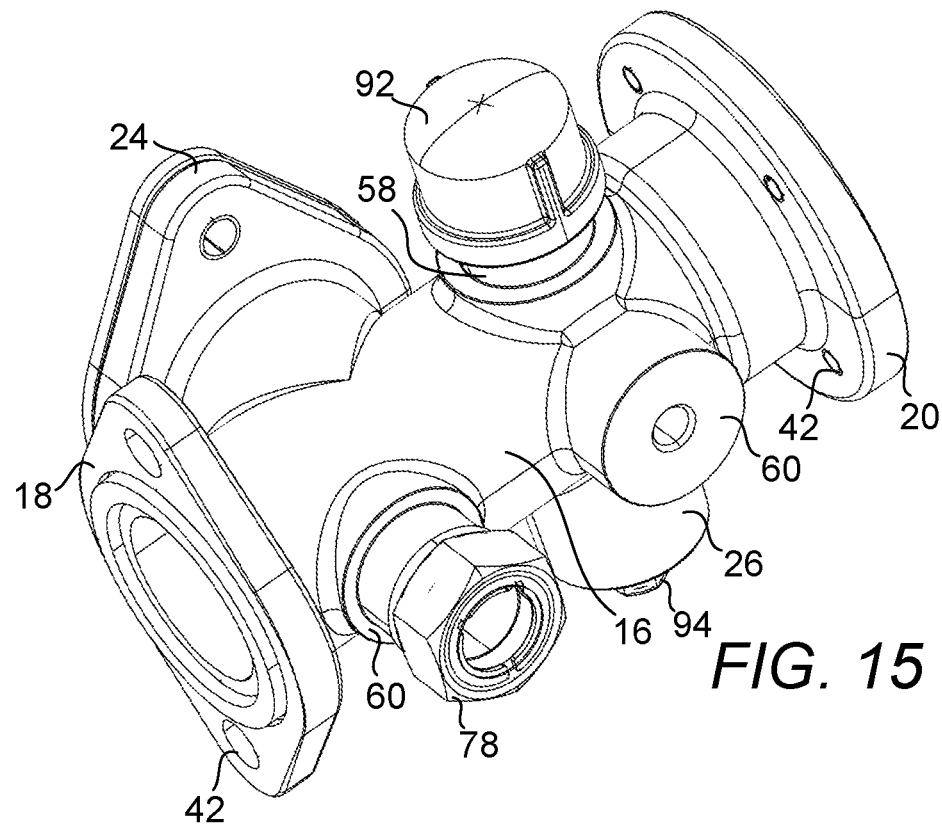
FIG. 15 is a bottom rear perspective view of the present fitting shown in FIG. 13.
Figure 16:
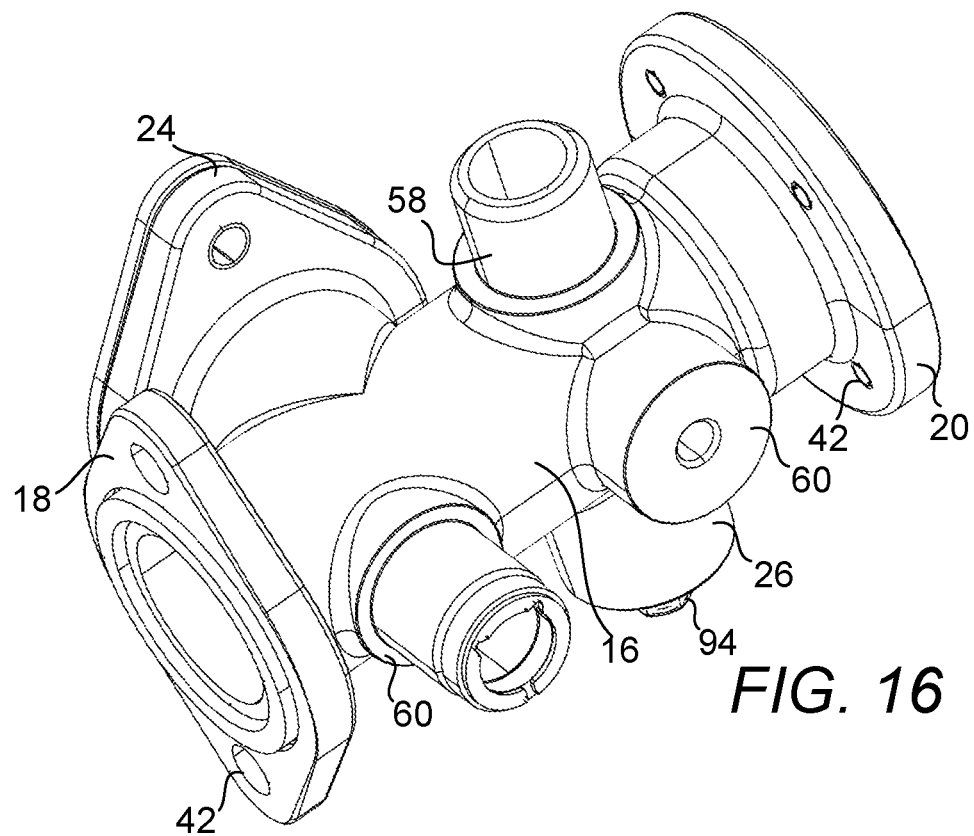
FIG. 16 is a bottom rear perspective view of the present fitting shown in FIG. 14.
Figure 17:
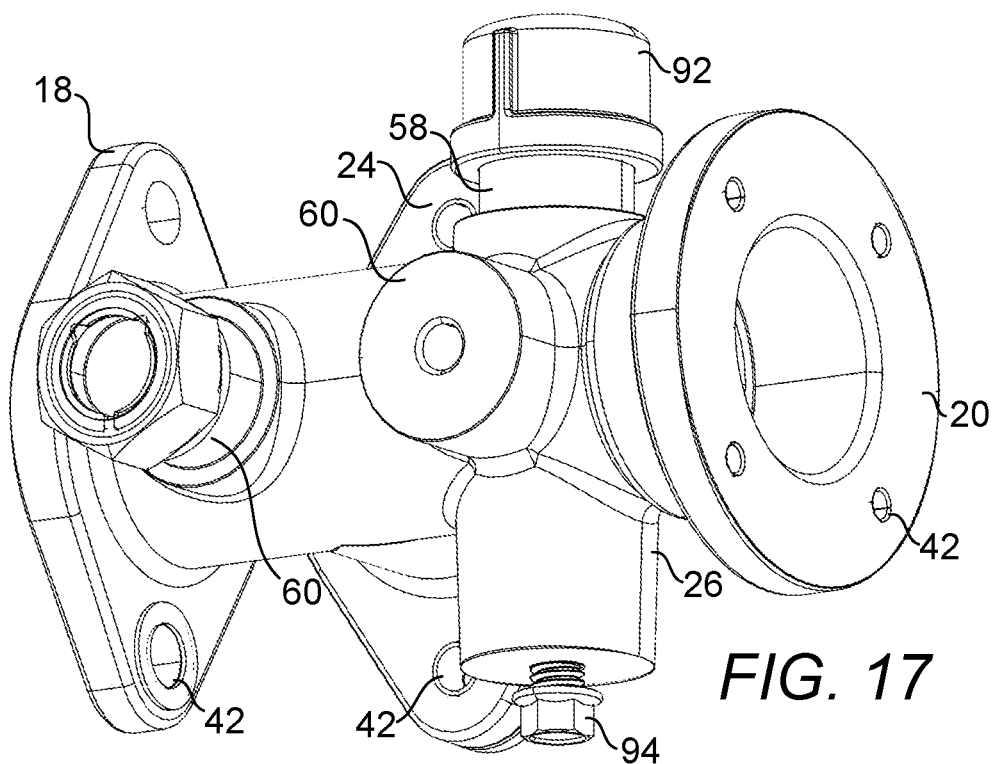
FIG. 17 is a top front perspective view of the present fitting shown in FIG. 13.
Figure 18:
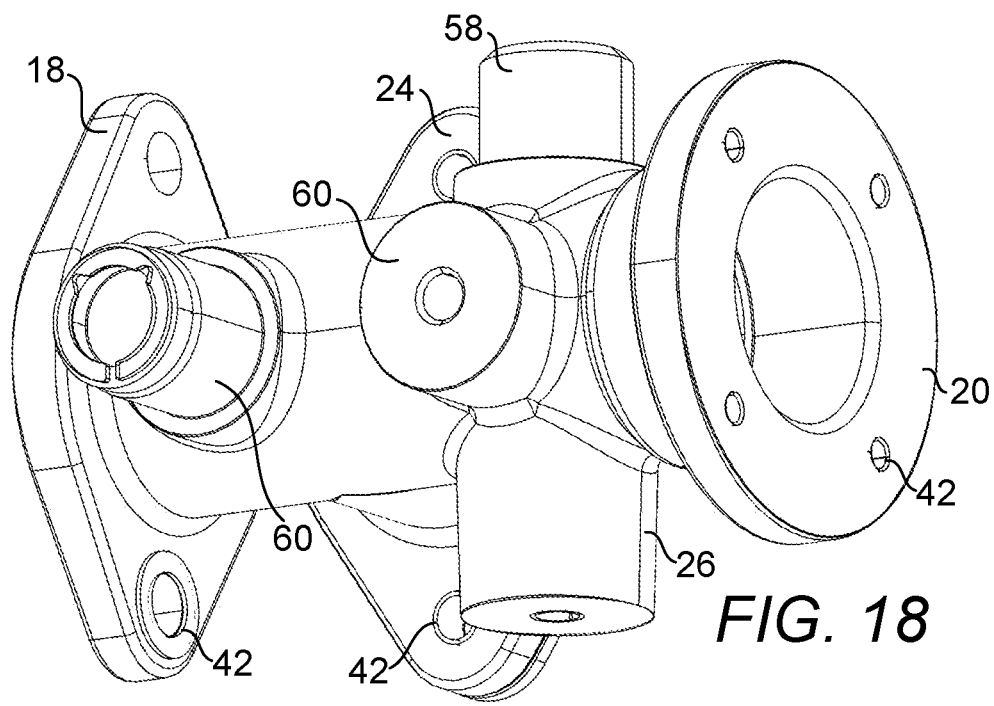
FIG. 18 is a top front perspective view of the present fitting shown in FIG. 14.
Figure 19:
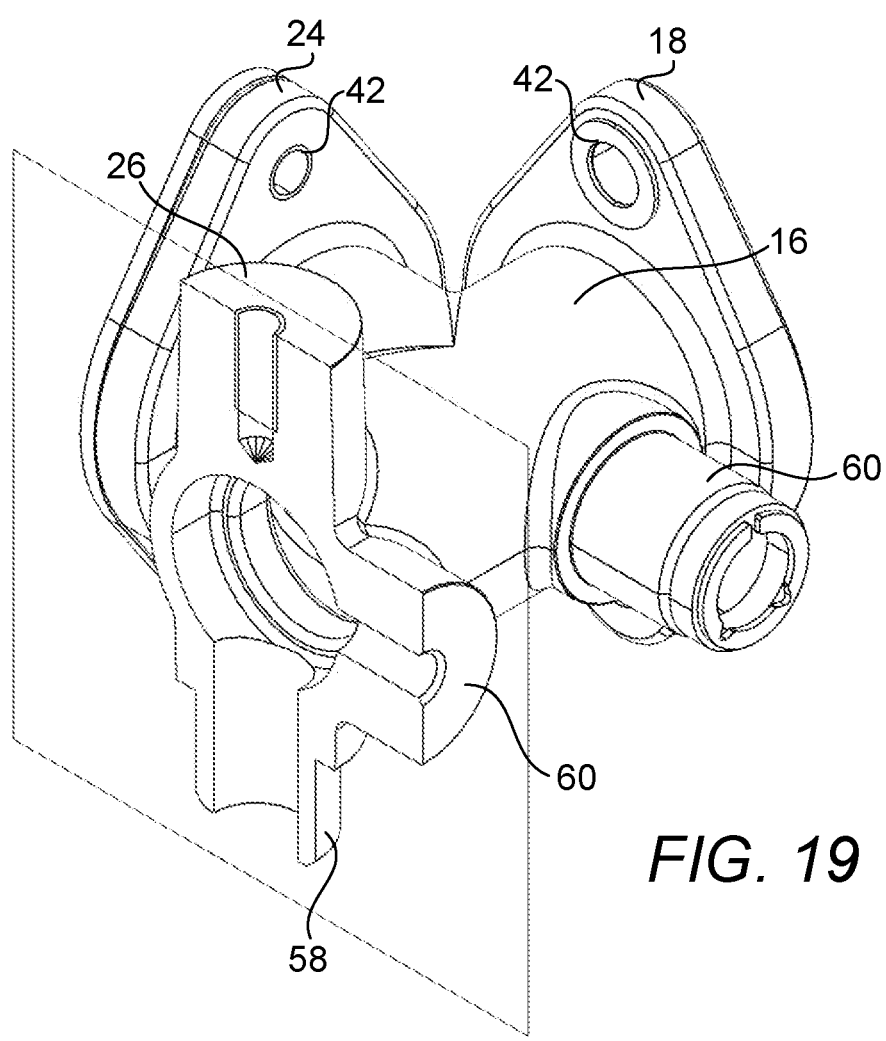
FIG. 19 is a top sectional front perspective view of the present fitting shown in FIG. 3.

FIGS. 13-18 show various parts or equipment which have been connected to a present fitting to further reveal the tubes and sub-tubes of the fitting that have been customized for various purposes. FIG. 19 is a top sectional front perspective view of the present fitting shown in FIG. 3. FIG. 13 is a bottom front perspective view of a present fitting having been modified to connect to various parts or equipment. FIG. 14 depicts the present fitting with a cap 92 removed to show a manner in which the present fitting can be used. FIG. 15 is a bottom rear perspective view of the present fitting shown in FIG. 13. FIG. 16 is a bottom rear perspective view of the present fitting shown in FIG. 14. FIG. 17 is a top front perspective view of the present fitting shown in FIG. 13. FIG. 18 is a top front perspective view of the present fitting shown in FIG. 14. It shall be noted that by using only one fitting, various functions may be served simply by combining various parts that interface with the fitting. In a conventional fluid system, multiple generic and general purpose parts, e.g., nipples, flange extensions, couplings, tees, elbows, reducers, etc., would be required as shown in FIG. 1.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A flow modifier comprising a reducer tube comprising a rectilinear central axis, an inlet end, an outlet end and a surface pattern disposed on an inner surface of said reducer tube, said inlet end of said reducer tube is larger than said outlet end of said reducer tube, said inlet end of said reducer tube configured for receiving a flow from said inlet end of said reducer tube to said outlet end of said reducer tube and said rectilinear central axis is disposed through said inlet end of said reducer tube and said outlet end of said reducer tube, wherein said surface pattern comprises at least one groove which swirls about said central axis of said reducer tube from said inlet end to said outlet end of said reducer tube to increase mixing of the flow through said flow modifier and said flow modifier further comprises a flange disposed on said inlet end of said flow modifier, said flange of said flow modifier comprises at least one hole and is configured to be secured between flange ends of two fluid conductors with a fastener through said at least one hole such that said flow modifier is disposed within at least one of the two fluid conductors in its installed state.

* * * * *